United States Patent [19]

Makino

[11] Patent Number: 4,764,829
[45] Date of Patent: Aug. 16, 1988

[54] MAGNETIC HEAD ASSEMBLY CAPABLE OF EFFECTIVELY CORRECTING POSITION ERROR OF A HEAD

[75] Inventor: Toshihiko Makino, Tokyo, Japan
[73] Assignee: NEC Corporation, Tokyo, Japan
[21] Appl. No.: 912,285
[22] Filed: Sep. 29, 1986

[30] Foreign Application Priority Data

Sep. 27, 1985 [JP] Japan ................... 60-215342

[51] Int. Cl.⁴ .................... G11B 5/55; G11B 21/08; G11B 5/56; G11B 21/24
[52] U.S. Cl. ........................ 360/106; 360/109
[58] Field of Search ............... 360/106, 109, 97–99, 360/75–78

[56] References Cited

U.S. PATENT DOCUMENTS

| 3,995,317 | 11/1976 | Schmidt | 360/109 |
| 4,295,172 | 10/1981 | Fukada et al. | 360/109 |
| 4,544,972 | 10/1985 | Kogure et al. | 360/106 |

FOREIGN PATENT DOCUMENTS 59-198569 11/1984 Japan .................. 360/109

OTHER PUBLICATIONS

Carmichael, "Skewed Axis Actuator for Disk File", IBM Technical Disclosure Bulletin, vol. 20, No. 11A, Apr. 1978, pp. 4623–4624.

*Primary Examiner*—John H. Wolff
*Assistant Examiner*—Matthew J. Bussan
*Attorney, Agent, or Firm*—Sughrue, Mion, Zinn, Macpeak & Seas

[57] ABSTRACT

In a magnetic head assembly wherein each magnetic head is moved along a magnetic recording medium by an arm element coupled to a shaft which has an axis held in a substantially perpendicular relation to a reference plane, an angle adjusting arrangement is coupled to the shaft to adjust an angle between the axis and the reference plane within the substantially perpendicular relation. Preferably, the shaft has a fixed end and a free end adjustable to make the angle between the axis and the reference plane. The angle adjusting arrangement may comprise a pair of electromechanical transducing elements, such as piezoelectric elements, coupled to the free end for use in adjusting the angle. The angle adjusting arrangement may further comprise a leaf spring element between the electromagnetic elements for urging the free end towards a position which the free end has before adjustment of the angle.

7 Claims, 1 Drawing Sheet

MAGNETIC HEAD ASSEMBLY CAPABLE OF EFFECTIVELY CORRECTING POSITION ERROR OF A HEAD

BACKGROUND OF THE INVENTION

This invention relates to a magnetic head assembly of a swing arm type for use in carrying out recording or reading operation, namely, access operation to a magnetic recording medium, such as a magnetic disk.

Such a magnetic head assembly includes a plurality of arms having a first end carrying a magnetic head and a second end which is pivotally coupled to a mounting member. The arms are swingable around an axis of the mounting member. Accordingly, the magnetic head assembly is called the swing arm type.

When the access operation is required, the arms are pivotally swung by an actuating device to move the magnetic heads along the recording mediums. In the manner known in the art, the recording medium has a plurality of tracks for keeping records of signals for reproduction. The magnetic head has a head position on a selected one of the tracks. The head position is controlled by a position signal which is representative of the head position. The position signal is derived from a suitable detecting device, such as a particular magnetic head which also scans the recording medium. The first-mentioned magnetic head will herein be referred to simply as a magnetic head.

In order to reliably carry out the access operation, it is necessary to exactly control a positional relation between the magnetic head and each of the tracks of the recording medium. However, it is difficult in a conventional magnetic head assembly of the swing arm type to control the positional relation. The difficulty comes from the fact that the mounting member and the recording medium are deformed as a result of a temperature change. This makes the magnetic head have a position error which is called a thermal off-track in the art and is caused by a temperature difference between the time of recording and the time of reading. Due to the position error, it is unavoidable that the tracks can not be densely recorded on the recording medium.

SUMMARY OF THE INVENTION

It is therefore an object of the present invention to provide a magnetic head assembly which is capable of effectively correcting a position error of a magnetic head.

It is another object of this invention to provide a magnetic head assembly of the type described, which makes it possible to record tracks densely on a magnetic recording medium.

Other objects of this invention will become clear as the description proceeds.

According to this invention, there is provided a magnetic head assembly for use in combination with a recording medium and having a predetermined reference plane. The magnetic head assembly comprises a magnetic head member movable along the predetermined reference plane, a mounting member having an axis which is held in a substantially perpendicular relation to the predetermined reference plane, an arm member having a first end mechanically coupled to the magnetic head member and a second end pivotally associated with the mounting member, actuating means coupled to the arm member for pivotally actuating the arm member around the axis and angle adjusting means coupled to the mounting member for adjusting an angle between the axis and the predetermined reference plane within the substantially perpendicular relation.

DESCRIPTION OF THE PREFERRED EMBODIMENT

Figure 1:
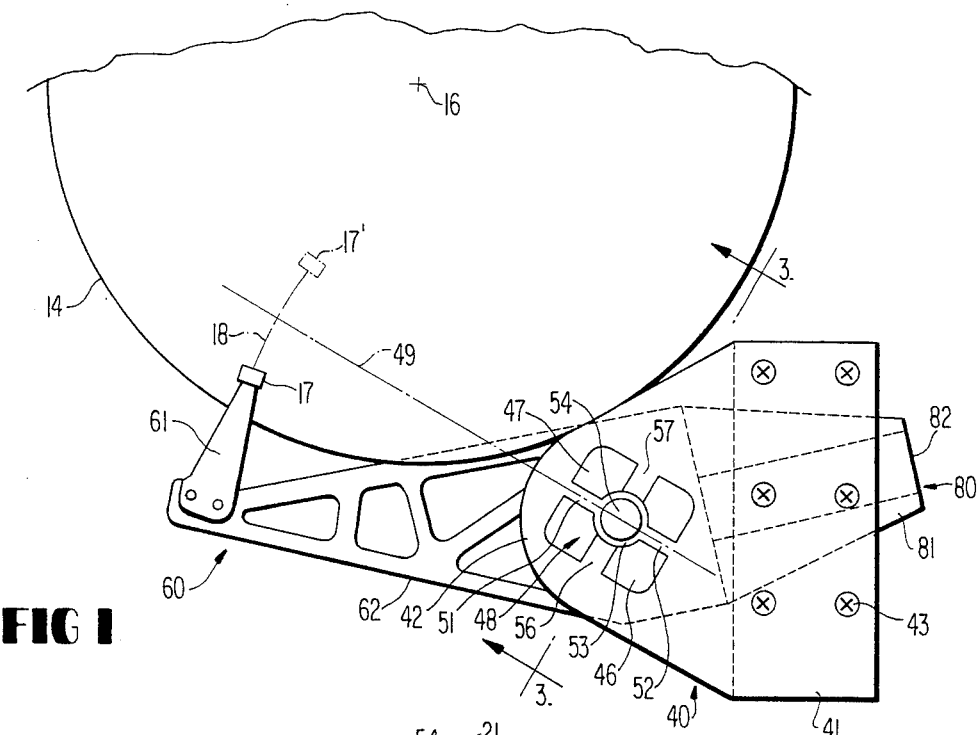
FIG. 1 is a plan view of a portion of a magnetic disk file device including a magnetic head assembly according to one embodiment of the instant invention.
Figure 2:
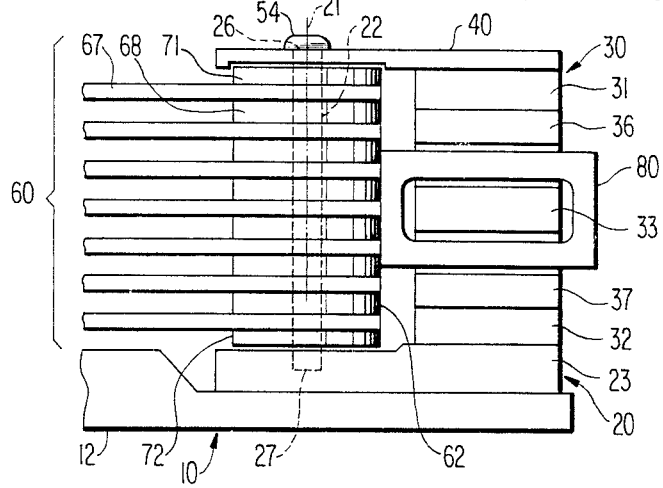
FIG. 2 is a front view of a portion of the magnetic disk file device illustrated in FIG. 1.

Referring to FIGS. 1 and 2, a magnetic disk file device includes a magnetic head assembly according to an embodiment of the present invention and comprises a frame 10 defining a predetermined reference plane 12. A plurality of magnetic disks 14 serve collectively as a recording medium element and are mounted on the frame 10. Each of the magnetic disks 14 is parallel to the reference plane 12 and has a recording area. At least a portion of the recording area serves as a control area which will be described far later in the description. Through the recording and the control areas, a plurality of tracks are concentrically formed around a disk axis 16 which is fixedly perpendicular to the reference plane 12. The tracks are for keeping records of signals for reproduction. A predetermined disk distance is retained between the magnetic disks 14. The magnetic disks 14 are rotatable around the disk axis 16.

The magnetic head assembly includes a magnetic head member 17 comprising a plurality of magnetic head elements which correspond to the magnetic disks 14 and are for carrying out recording or reading operation on the magnetic disks 14, respectively. The magnetic head member 17 is substantially rectilinearly movable along a predetermined locus 18 across the recording area. In practice, the predetermined locus 18 is a circular arc of an appreciable radius of curvature as will later becomes clear. In FIG. 1, a reference numeral 17' shows a position where the magnetic head member 17 is moved most inwardly of the disks 14.

Description will be made hereafter in relation to a carrying mechanism for carrying the magnetic head member 17.

The magnetic head assembly further comprises a mounting member 20 placed on the frame 10. The mounting member 20 has a mounting axis 21 which will presently be described and is held in a substantially perpendicular relation to the reference plane 12 in the manner to be later described more in detail. The mounting member 20 comprises a shaft 22 and a lower plate 23. The shaft 22 is extended along the mounting axis 21 and has first and second axial ends 26 and 27. Each of the first and the second axial ends 26 and 27 is indicated by a dashed lead and will later be described in detail. The first axial end 26 is circular in the example being illustrated. The lower plate 23 is fixedly secured to the frame 10 and mechanically coupled to the second axial end 27 of the shaft 22. As a result, the lower plate 23 serves as a supporting arrangement for supporting the second axial end 27 fixedly relative to the reference surface 12.

An E-shaped yoke 30 is placed on the lower plate 23 and secured thereto. The yoke 30 comprises a plate member parallel to the plane of FIG. 2 and upper, lower, and central poles 31, 32, and 33 extended upwardly of the plane of FIG. 2 with upper and lower permanent magnet elements 36 and 37 secured to inside surfaces of the upper and the lower poles 31 and 32, respectively. Spaces are formed between the upper permanent magnet element 36 and an upper surface of the central pole 33 and a lower surface of the central pole 33 and the lower permanent magnet element 37 for the purpose which will later become clear. The yoke 30 and the permanent magnet elements 36 and 37 will herein be called a stationary portion.

The magnetic head assembly further comprises an upper plate 40 which is parallel to the reference surface 12 and opposite to the lower plate 20. In the manner best shown in FIG. 1, the upper plate 40 has first and second portions 41 and 42. The first portion 41 is rectangular and is placed on the yoke 30 and secured thereto by a plurality of screw members 43. The second portion 42 has a shape of a rounded-head triangle having first and second apertures 46 and 47 formed therethrough. The first and the second apertures 46 and 47 are parallel to one side of the triangle in the example being illustrated. The first and the second apertures 46 and 47 are for defining a leaf spring element 48 extended in a first predetermined direction 49 which is substantially perpendicular to the predetermined locus 18 described heretobefore. It is preferable that the first predetermined direction 49 intersects the predetermined locus 18 at a central point between both ends of the predetermined locus 18.

The leaf spring element 48 is integral with the second portion 42 of the upper plate 40 and has two bridge portions 51 and 52 and a ring portion 53 therebetween. The bridge portions 51 and 52 are for mechanically and elastically coupling the ring portion 53 to the second portion 42. The ring portion 53 defines a circular opening in which the first axial end 26 of the shaft 22 closely fits. The ring portion 53 is secured to the first axial end 26 by a screw member 54, in the manner best shown in FIG. 3. As a result, the first axial end 26 is substantially coplanar with an upper surface of the upper plate 40 and is so elastically supported in an original position by the leaf spring element 48 as to be slightly movable substantially parallel to the reference plane 12. It is a matter of course that the original position is in the above-mentioned substantial perpendicular relation to the reference plane 12.

The magnetic head assembly further comprises first and second electromechanical transducing elements 56 and 57, such as piezoelectric elements, placed in the first and the second apertures 46 and 47, respectively. Each of the first and the second transducing elements 56 and 57 is extended in a second predetermined direction which is parallel to the reference plane 12 and perpendicular to the first predetermined direction 49. The first and the second electromechanical transducing elements 56 and 57 are secured between the second portion 42 and the ring portion 53 in the first and the second apertures 46 and 47, respectively.

When the first transducing element 56 is supplied with a drive signal, it lengthens in the above-mentioned second predetermined direction to urge the ring portion 53 and the leaf spring element 48 towards the second transducing element 57. In this event, a spring force is produced in the leaf spring element 48.

When the drive signal is supplied to the second transducing element 57, similar operation is carried out except the leaf spring element 48 is urged in a reverse sense of the second predetermined direction.

The ring portion 53 drives the first axial end 26 of the shaft 22 substantially parallel to the reference plane 12. Therefore, each of the first and the second transducing elements 56 and 57 serves as a drive arrangement for driving the first axial end 26. Thus, the shaft 22 is moved to adjust an angle between the mounting axis 21 and the reference plane 12 within the above-mentioned substantially perpendicular relation.

When the drive signal is removed from both of the first and the second transducing elements 56 and 57, the first axial end 26 is returned back to the original position by the spring force of the leaf spring element 48. Therefore, the leaf spring element 48 serves as an urging arrangement which is responsive to adjustment of the angle for urging the first axial end 26 towards the original position. A combination of the leaf spring, the first transducing and the second transducing elements 48, 56, and 57 will be referred to angle adjusting arrangement.

The magnetic head assembly further comprises an arm member 60 mounted on the mounting member 20. The arm member 60 has a first end 61 carrying the magnetic head member 17 and a second end 62 pivotally coupled to the shaft 22 in the manner which will be described in the following.

Figure 3:
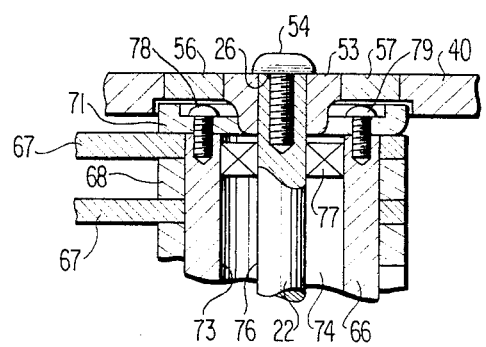
FIG. 3 is an enlarged sectional view taken along a line 3—3 in FIG. 1.

Referring to FIG. 3 in addition to FIG. 2, the second end 62 of the arm member 60 comprises a sleeve 66 a plurality of arm elements 67, a plurality of ring-shaped spacers 68, and upper and lower end plates 71 and 72 as will shortly be described. The sleeve 66 has an inwardly directed cylindrical surface 73 defining an axial hole 74. The shaft 22 has an outwardly directed peripheral surface 76 and is placed through the axial hole 74. A plurality of ball bearing elements 77 (only one of which is shown in FIG. 3) are placed between the cylindrical surface 73 and the peripheral surface 76 so that the sleeve 66 is smoothly rotatable around the shaft 22.

Each of the arm elements 67 is extended in parallel to the reference plane 12 and has a circular opening in which the sleeve 66 can rotate. Each of the spacers 68 is placed between two adjacent ones of the arm elements 67 to define an arm distance which is equal to the above-mentioned disk distance. The upper and the lower end plates 71 and 72 are secured to upper and lower axial ends of the sleeve 66 by securing member, such as screws 78 and 79, respectively. The upper and the lower end plates 71 and 72 are thereby for tightly holding the arm elements 67 therebetween with the spacers 68 interposed along the sleeve 66. As a result, the arm elements 67 are secured to an outwardly directed peripheral surface of the sleeve 66.

In this manner, the arm member 60 is pivotally swingable around the shaft 22 to move the magnetic head member 17 along the predetermined locus 18. It is a matter of course that each magnetic head of the magnetic head member 17 is secured to the first end 61 of one of the arm elements 67 of the arm member 60.

Referring back to FIGS. 1 and 2, a coil member 80 is mounted on the arm member 60 in the afore-mentioned spaces left between the central pole 33 and the first and the second permanent magnet elements 36 and 37. The coil member 80 comprises a bobbin 81 of a trapezoidal form in plan. The bobbin 81 is secured to the second end 62 of the arm member 60. A coil 82 is wound around the bobbin 81. It will be understood that the bobbin 81 is moved together with swinging of the arm member 60 and therefore is herein called a movable portion. When a direct voltage is supplied across the coil 82, a rotating force is generated by cooperation between the coil 82 and the permanent magnet elements 36 and 37 to produce a relative motion between the stationary and the movable portions. Therefore, the arm member 60 is swung by the rotating force to arcuately move the magnetic head member 17 along the predetermined locus 18.

It will be assumed that the lowest one of the magnetic head elements of the magnetic head member 17 is the particular magnetic head mentioned hereinabove. In this event, the direct voltage is derived from a control unit (not shown) which receives informations from one of the magnetic disks 14 that is scanned by the lowest magnetic head element. Each of the other mangetic disks will hereafter be called a data magnetic disk which is scanned by a corresponding one of the magnetic head elements.

A combination of the yoke 30, the permanent magnet elements 36 and 37, and the coil member 80 is called a voice coil motor. The combination serves as an actuating arrangement which pivotally actuates the arm member 60 around the mounting axis 21.

A control signal is derived from the control area of each data magnetic disk by a corresponding magnetic head element. The control signal may be of the servo signal described in Japanese prepatent publication (Kôkai or publication of unexamined patent application) No. 81,603 of 1976 for an invention by Takao Suzuki et al. Such a control signal represents the quantity and the direction of the above-mentioned position error of the magnetic head by which the control signal is produced. The control signal is supplied to the control unit for producing the drive signal in the manner known in the art.

According to the magnetic head assembly thus far described, it is possible to correct position of the magnetic head member 60 by controlling the drive signal supplied to the first and the second transducing elements 56 and 57. In case where a selected one of the magnetic head elements is offset outwardly from an objective one of the tracks, the drive signal is supplied only to the first transducing element 56. At the same time, the second transducing element 57 may be supplied with an additional signal which serves to shorten the second transducing element 57 in the second predetermined direction. In case when the selected magnetic head element is offset inwardly from the objective track, the drive signal is supplied only to the second transducing element 57. At the same time, the additional signal may be supplied to the first transducing element 56. In this event, the additional signal serves to shorten the first transducing element 56 in the second predetermined direction. In any case, adjustment is carried out for the angle between the mounting axis 21 and the reference plane 12 within the substantial perpendicular relation. Thus, the drive signal is supplied to the first and the second transducing element 56 and 57 in response to the direction of the position error of the selected magnetic head element. In this event, the drive signal has a suitable strength which is controlled by the control signal and is determined by each position error. In other words, the drive signal has a magnitude corresponding to the quantity of each position error of the arm elements, namely, the magnetic head elements. Therefore, the selected magnetic head element has a proper position according to adjustment of the angle and exactly scans the objective track.

While this invention has thus far been described in conjunction with one embodiment thereof, it will readily be possible for those skilled in the art to put this invention into practice in various other manners. For example, a stepping motor may be used instead of the voice coil motor to pivotally actuate the arm member 60 around the mounting axis 21.

What is claimed is:

1. A magnetic head assembly for use in combination with a recording medium member, said assembly having a predetermined reference plane and comprising:

a magnetic head member movable along said predetermined reference plane;

a mounting member having a shaft which is extended along an axis held in a substantially perpendicular relation to said predetermined reference plane;

an arm member having a first end mechanically coupled to said magnetic head member and a second end pivotally associated with said shaft;

actuating means coupled to said arm member for pivotally actuating said arm member around said axis; and angle adjusting means couple to said mounting member for adjusting an angle between said axis and said predetermined reference plane within said substantially perpendicular relation, said angle adjusting means comprising an electromechanical transducing element mechanically coupled to said shaft for inclining said shaft within said substantially perpendicular relation when it is driven.

2. A magnetic head assembly as claimed in claim 1, said shaft having a first and second axial end, wherein said mounting member comprises:

supporting means mechanically coupled to said second axial end for supporting said second axial end fixedly relative to said predetermined reference plane;

said first axial end being movable so that said axis is held relative to said second axial end in said substantially perpendicular relation.

3. A magnetic head assembly as claimed in claim 2, the second end of said arm member having an inwardly directed cylindrical surface defining an axial hole along said axis, said shaft having an outwardly directed peripheral surface received in said axial hole, said mounting member comprising bearing means between said cylindrical surface and said peripheral surface for rotatably associating the second end of said arm member with said shaft.

4. A magnetic head assembly as claimed in claim 2, wherein said electromechanical transducing element is mechanically coupled to said first axial end of the shaft for driving said first axial end substantially parallel to said predetermined reference plane to adjust said angle.

5. A magnetic head assembly as claimed in claim 4, said first axial end of the shaft having an original position in said substantial perpendicular relation to the predetermined reference plane, wherein said angle adjusting means further comprises urging means coupled to said first axial end and responsive to adjustment of said angle for urging said first axial end towards said original position.

6. A magnetic head assembly as claimed in claim 5, said recording medium member having a recording area, said magnetic head member being movable along a predetermined locus across said recording area, wherein;

said urging means comprising a leaf spring element extended in a predetermined direction which intersects with said predetermined locus and said axis and coupled to said first axial end through said electromechanical transducing element to be responsive to the adjustment of said angle to return said first axial end to said original position.

7. A magnetic head assembly as claimed in claim 1, wherein said actuating means comprises:
   a stationary portion mechanically coupled to said mounting member;
   a movable portion mechanically coupled to said arm member; and
   means for producing a relative motion between said stationary and said movable portions to pivotally actuate said arm member around said axis.

* * * * *